(12) United States Patent
Snyder et al.

(10) Patent No.: US 7,753,155 B2
(45) Date of Patent: Jul. 13, 2010

(54) FRONT DRIVE SYSTEM FOR A SNOWMOBILE

(76) Inventors: Jacob B. Snyder, 567 S. Hazel Dr., Salem, UT (US) 84653; Donald A. Davis, 1418 Lancelot Dr., Provo, UT (US) 84601

( * ) Notice: Subject to any disclaimer, the term of this patent is extended or adjusted under 35 U.S.C. 154(b) by 127 days.

(21) Appl. No.: 11/732,932

(22) Filed: Apr. 4, 2007

(65) Prior Publication Data

US 2007/0246268 A1 Oct. 25, 2007

Related U.S. Application Data

(60) Provisional application No. 60/789,309, filed on Apr. 4, 2006.

(51) Int. Cl.
*B62D 55/00* (2006.01)
*B62M 29/00* (2006.01)
(52) U.S. Cl. .............. 180/192; 180/9.44; 180/190
(58) Field of Classification Search .............. 180/9.1, 180/9.25, 9.26, 9.5, 9.52, 9.54, 9.58, 190, 180/191, 192, 193, 9.44, 9.46; 305/127, 305/135
See application file for complete search history.

(56) References Cited

U.S. PATENT DOCUMENTS

| 4,662,468 A | | 5/1987 | Ethier |
| 4,714,125 A | * | 12/1987 | Stacy, Jr. ............... 180/182 |
| 6,006,847 A | | 12/1999 | Knight |
| 6,431,301 B1 | * | 8/2002 | Forbes .................. 180/185 |
| 7,357,201 B2 | * | 4/2008 | Jordan ................... 180/9.26 |
| 2003/0209372 A1 | * | 11/2003 | Campbell et al. ........ 180/9.44 |

OTHER PUBLICATIONS

Litefoot Rubber Track Coversion Systems, www.mattracks.com, 2005, 2 pages.
ATV Illustrated, Canada's Largest ATV Jamboree, Spring Jam 2006, 3 pages.

* cited by examiner

*Primary Examiner*—Lesley Morris
*Assistant Examiner*—Marc A Scharich

(57) ABSTRACT

A snowmobile having a multiple endless track propulsion system. The multiple track propulsion system includes a rear endless track operably supported to engage a ground surface, and a pair of steerable front endless tracks positioned forward of the rear endless track. The front endless tracks are oriented in a spaced-apart, parallel relationship to one another, and operable to engage the ground surface. A power supply is disposed in the snowmobile body and operably configured to power the rear endless track and the pair of front endless tracks to propel the snowmobile.

20 Claims, 14 Drawing Sheets

FRONT DRIVE SYSTEM FOR A SNOWMOBILE

CLAIM OF PRIORITY

Priority of U.S. Provisional Patent Application Ser. No. 60/789,309 filed on Apr. 4, 2006 is claimed.

FIELD OF THE INVENTION

The present invention relates generally to snowmobiles and the drive systems used to propel such snowmobiles across terrain, and more particularly to a front drive system operable with the rear drive system to propel the snowmobile.

BACKGROUND OF THE INVENTION AND RELATED ART

Snowmobiles are vehicles designed primarily to move or travel over snow covered terrain. Generally, snowmobiles are open air vehicles with a motorcycle style seat that can accommodate up to four people. Snowmobiles are usually powered by an internal combustion engine that drives a long continuous or endless track which is located in a rearward position of the snowmobile, and substantially below or underneath the seat. This continuous or endless track, powered by the snowmobile's motor, is configured to engage the snow covered terrain and propel the snowmobile over the snow. The track provides a similar function for the snowmobile as a tire does on a road vehicle.

Snowmobiles are typically further equipped with a pair of skis positioned in a forward position. The function of the skis is to provide a front ground contact for stabilization, as well as to facilitate guiding or steering of the snowmobile. A pair of handlebars, accessible by an occupant on the seat, can be pivoted in order to turn the skis and thus turn or steer the snowmobile.

The front skis on a snowmobile, however, have several disadvantages that affect snowmobile performance and operation. For example, since the skis are designed to slide over the snow, they provide very little traction to the snowmobile. Consequently, the rear track often partially overpowers the traction of the ski and continues to push the snowmobile forward instead of through a turn. This partial overpowering of the ski traction causes the vehicle to make a wider turn, thereby affecting the cornering ability and overall handling of the snowmobile. Sometimes the rear track completely overpowers the skis and moves the snowmobile in a forward direction regardless of the direction the skis are turned. This is particularly the case when trying to traverse across hard surfaces such as hard pack snow, asphalt, or the like. The problem is compounded as snow provides a poor traction surface, and in the case of unpacked snow, is easily pushed or displaced. As such, when turning or moving sideways along a hill, the rider must often lean dramatically on the snowmobile in order to weight the front end and get the skis to bite into the snow. To account for these problems, those skilled in the art have equipped snowmobile skis with rails that extend down from the underside or contact portion of the skis. Although the rails are designed to increase the traction of the snowmobile by digging into the snow, these rails result in only marginal improvements.

Another disadvantage of the front skis is that they provide no assistance to the snowmobile's ability to accelerate, slow down, or reverse. In other words, they are passive and provide no driving force. In fact, since all the skis do is slide on or across the snow, they actually decrease the efficiency of the snowmobile as they tend to produce drag and a resistance that the rear endless track must overcome. Moreover, since the rear endless track of typical snowmobiles can sometimes become bogged down by snow, ice, rocks, and other debris becoming lodged in the track tunnel between the track and the seat, the additional resistance of the skis can stop the snowmobile from moving at all.

Still another disadvantage of the front skis is that they tend to ride on the top or upper surface of the snow, whereas the rear track tends to dig into the snow due to its driving force as powered by the snowmobile's motor, thus actively displacing the snow. The result of this is that the snowmobile has a tendency to move or travel with its longitudinal axis oriented on an incline with respect to the ground level, with the front end higher than the back end. In this position, there is less weight being placed on the skis, and thus the snowmobile is more difficult to maneuver and turn. In addition, this can provide vision problems as the rider's line of sight to the ground surface is obstructed causing him/her to have to look a greater distance past the front of the snowmobile to see the ground surface. This problem is made worse at night time since it causes the headlight of the snowmobile to point uselessly toward the sky instead of on the ground in front of the moving machine.

SUMMARY OF THE INVENTION

In light of the problems and deficiencies inherent in the prior art, it is recognized that it would be advantageous to develop a method and system for propelling a snowmobile using a front drive system that is operable independent of or together with the rear drive system of the snowmobile. As such, the present invention seeks to overcome the problems and deficiencies of the prior art by providing a front drive system for a snowmobile, in which one or more front ground contacting assemblies, supported by the frame of the snowmobile, is configured with an endless track that is similar to and that is operable with the rear endless track to propel the snowmobile across snow-covered or other terrain. Such a front drive system, and the front endless tracks operable therewith, is intended to increase the overall performance of the snowmobile, and particularly the traction of the snowmobile, by providing active displacement of the snow in a manner similar to that of the rear drive system and the rear endless track. Such a front drive system will further, among other things, improve overall cornering, climbing, and turning of the snowmobile, as well decrease overall slip or sliding of the snowmobile.

In addition, the front drive system of the present invention will improve over prior related snowmobiles in the areas of slowing, stopping, braking, and reversing a snowmobile.

In accordance with the invention as embodied and broadly described herein, the present invention provides for a snowmobile having a multiple track propulsion system. The snowmobile can include a snowmobile body having a frame, a seat, handlebars, an engine compartment, and a multiple track propulsion system for propelling the snowmobile. The multiple track propulsion system can include a single rear endless track operably supported to engage a ground surface, and a pair of steerable front endless tracks positioned forward of the rear endless track. The front endless tracks can be oriented in a spaced-apart, parallel relationship to one another, and operable to engage the ground surface. A motor can be disposed in the snowmobile body and operably configured to power the single rear endless track and the pair of front endless tracks to propel the snowmobile.

The present invention also provides for a method for moving a snowmobile including operating a power supply supported by the snowmobile and causing the power supply to turn a pair of front endless tracks and a rear endless track. The front endless tracks can be disposed in a spaced apart parallel relationship to one another and positioned in front of the rear endless track. A ground surface can be engaged with the front endless tracks and a rear endless track to propel the snowmobile.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

DETAILED DESCRIPTION OF EXEMPLARY EMBODIMENTS

Figure 1:
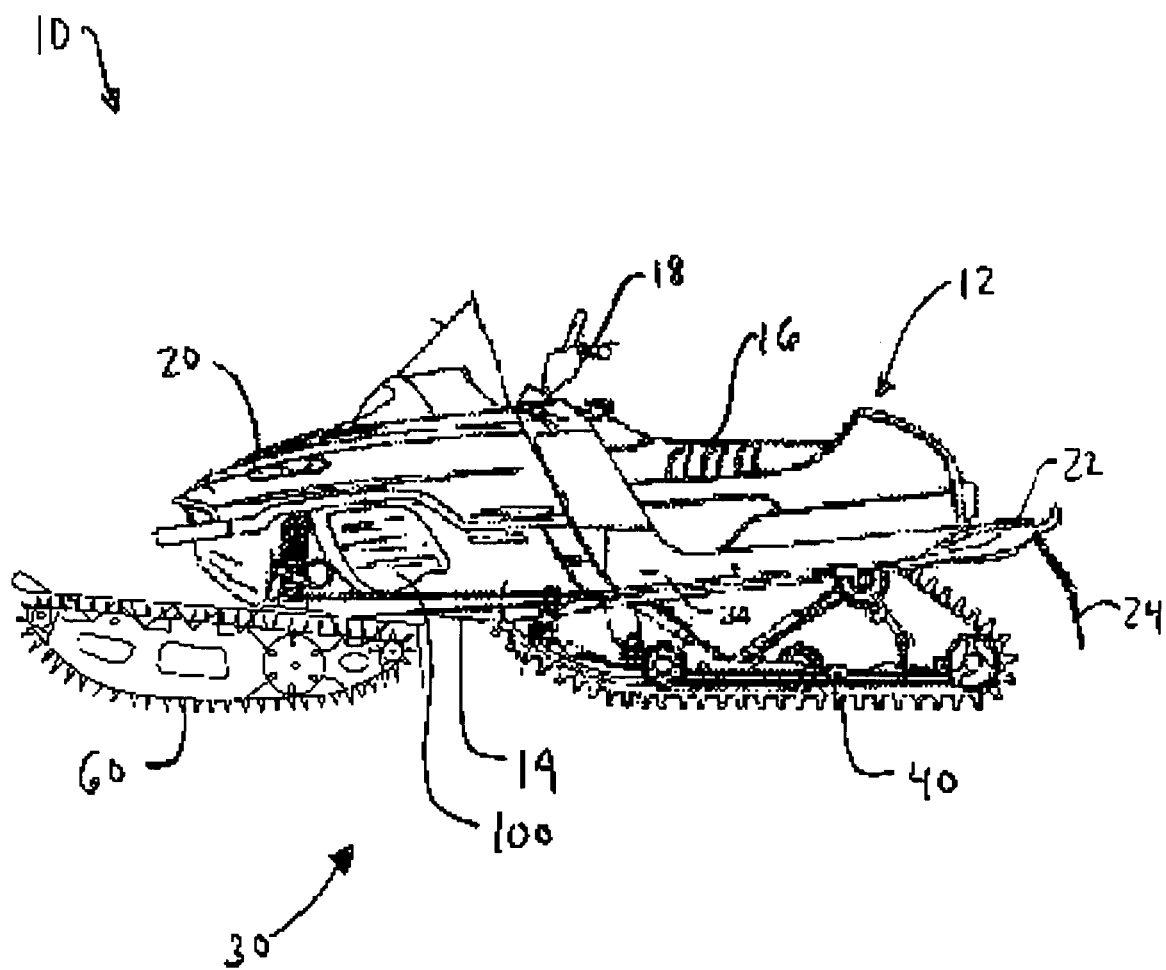
FIG. 1 illustrates a side view of a snowmobile with a multiple track propulsion system in accordance with an embodiment of the present invention.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

The present invention describes a method and device for propelling a snowmobile using a front drive system. The front drive system may be configured to power the snowmobile along, or in combination with the rear drive system common to conventional snowmobiles. The front drive system is designed to replace the ski configuration and setup of existing or prior related snowmobiles with front ground contacting assemblies, each having an endless track properly supported and powered by the motor of the snowmobile. In most embodiments, the snowmobile will comprise a multiple track system comprising three continuous or endless tracks, namely a single rear endless track supported by a rear ground contacting assembly, as commonly known in the art, and a first and second front endless track, each supported by respective ground contacting assemblies.

More specifically, the present invention contemplates a snowmobile comprising a rear drive system comprising a rear ground contacting assembly supporting a rear endless track that is positioned substantially under the seat of the snowmobile and in a rearward position with respect to the front of the snowmobile, as is commonly understood in the art. Operable with the rear drive system and the rear endless track is a front drive system comprising a pair of front ground contacting assemblies each supporting a front endless track. The front endless tracks are disposed and supported in a spaced apart, parallel relationship to one another and positioned in a forward position relative to the rear endless track. The pair of front ground contacting assemblies and front endless tracks are configured to be steerable in a similar manner as skis on conventional snowmobiles. As such, the front ground contacting assemblies are each operably coupled to the steering system of the snowmobile, which steering system is controllable by the rider via the handlebars, as is also commonly known in the art. Turing the handlebars effectively functions to pivot or turn the front ground contacting assemblies and the front endless tracks, thus turning and steering the snowmobile. Each of the pair of front endless tracks receives power from a snowmobile power supply, such as an engine or motor. Thus, when powered, the pair of front tracks engage the terrain and propel the snowmobile in a similar manner as the rear endless track, although instead of pushing the snowmobile as the rear endless track does, the front endless tracks provide a pulling force similar to other front driven vehicles, such as a front-wheel drive or four-wheel drive vehicle.

The present invention provides several significant advantages over prior related snowmobiles, some of which are recited here and throughout the following more detailed description. First, and perhaps the most significant advantage, is that the multiple track system of the snowmobile provides for better traction while traversing snow-covered terrain. Better traction results in many improvements, some of which include, but are not limited to, better acceleration, increased speeds, easier and safer hill climbing, better towing, improved cornering, a reduced chance of getting stuck, and more efficient motor operation. Second, the front endless tracks enable the use of shorter and narrower rear endless tracks on a snowmobile, if desired. Longer tracks are typically utilized on snowmobiles designed for use in powder or soft, unpacked snow. The longer track provides a greater surface area to be continuously in contact with the snow. As such, by providing both front and rear drive systems, such long tracks may either be shortened or complemented. Third, the snowmobile is able to travel in a more planed orientation with respect to the ground surface during use. In other words, the longitudinal axis of the snowmobile is kept on less of an incline with respect to the ground surface. Fourth, use of a front drive system provides better deceleration and stopping or braking ability on snowy and icy terrain.

Additionally, the present invention provides several significant advantages over other prior related multi-tracked snow vehicles, such as two or four tracked vehicles. For example, in some appropriately configured embodiments, the three tracked vehicle described herein may provide for improved cornering by forward rotation of one of the forward tracks at one speed, forward, stopped or reverse rotation by the other of the forward tracks, at the same or different speed, while at the same time providing the forward thrust of the single main rear track. Such cornering and forward thrust capability has heretofore been unrealized by either two or four tracked vehicles known in the art and provides superior planing or siding capability when traveling along a snowy hill side, and greater maneuverability when executing sliding or airborne tricks.

Other advantages of the present invention include: a more rugged ATV type look; being able to do power wheelies in reverse; allowing the front brake to enable the snowmobile to do a front "endo" trick; better power in climbing and power travel; better reverse power and acceleration; slower and more controlled approaches to sled loaders since there are no skis to stick in the snow; lower speeds in climbing hills; less wear and tear on sled trailers; easier manual maneuvering of the snowmobile; lower speed when traveling across water; easier steering when the sled is in motion; better hill siding; less sinking in powder; less leaning when turning; reducing the likelihood of tipping a snowmobile over; increased vision at night since snowmobile is level and headlight will shine on the ground; less rear track wedging of debris since front tracks can help rear track power through a wedge-out; less wear and tear on an engine since there is less drag; lower center of gravity; less wear and tear of the rear track since front tracks can give power assist; easier track rut egress since the front tracks can pull the snowmobile out of the track ruts; better cooling on hard pack snow since front tracks can loosen snow for rear track to throw onto cooling deck; and the ability to use shorter cleats on track treads since tread foot print and overall contact surface area is increased.

Each of the above-recited advantages will be apparent in light of the detailed description set forth below, with reference to the accompanying drawings. These advantages are not meant to be limiting in any way. Indeed, one skilled in the art will appreciate that other advantages may be realized, other than those specifically recited herein, upon practicing the present invention.

Figure 2:
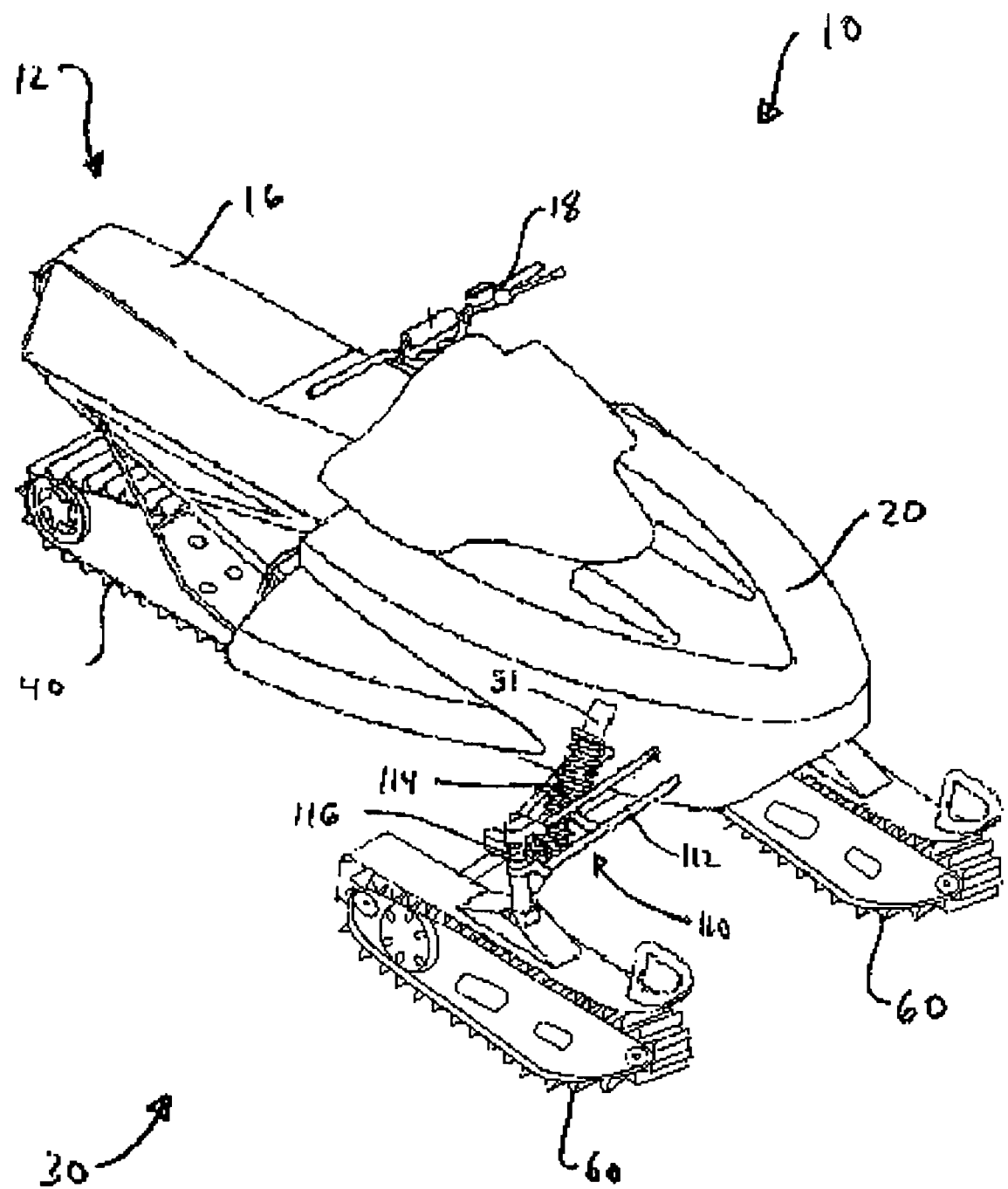
FIG. 2 illustrates perspective view of the snowmobile of FIG. 1.
Figure 3:
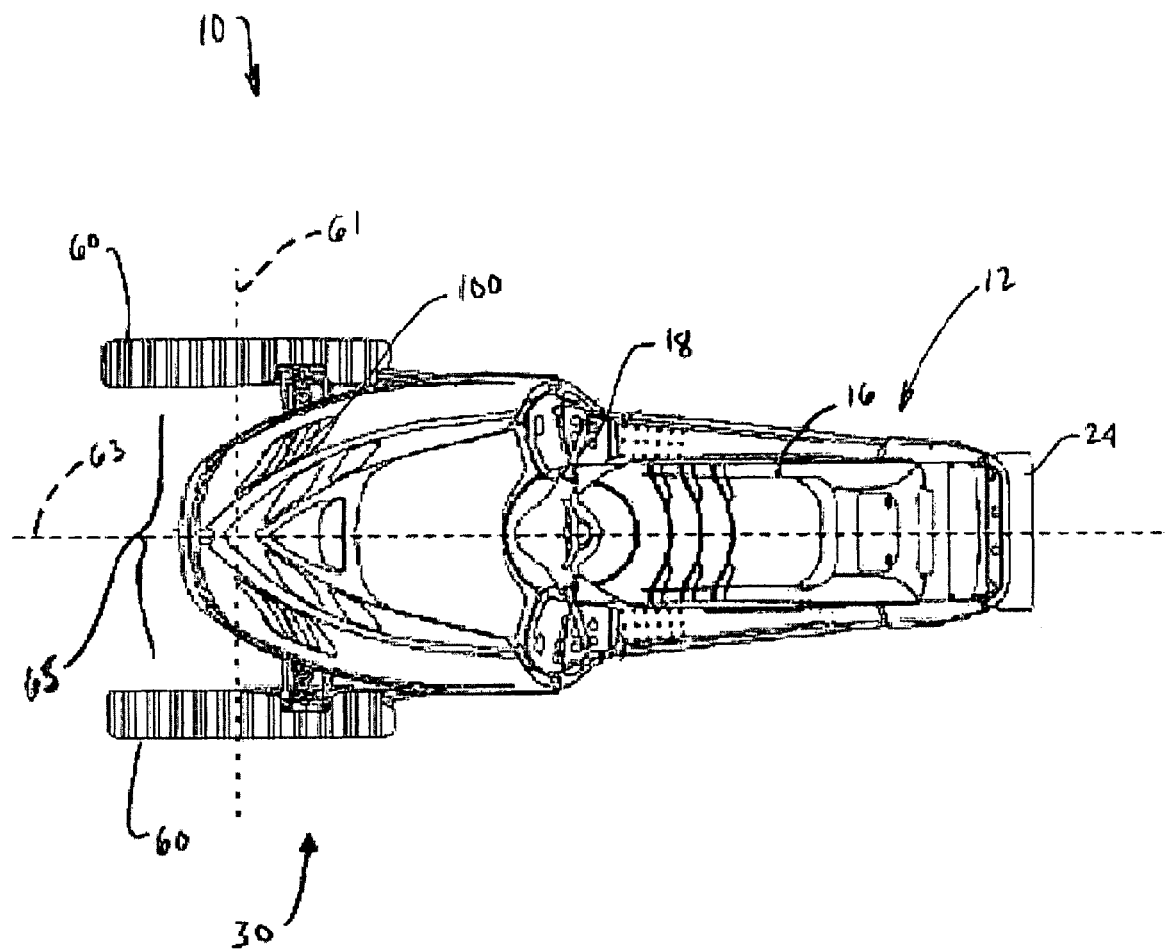
FIG. 3 illustrates a top view of the snowmobile of FIG. 1.
Figure 4:
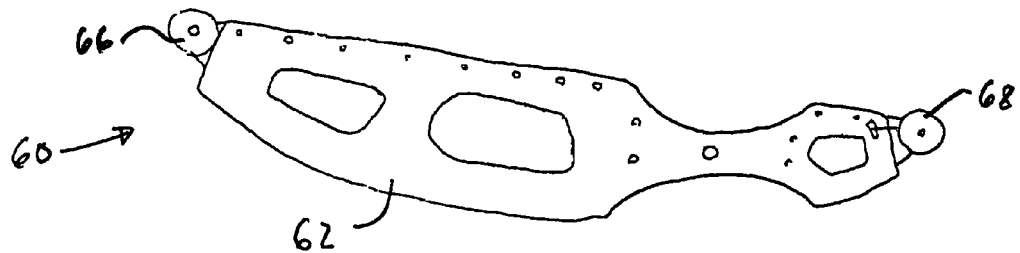
FIG. 4 illustrates a side view of a front endless track in accordance with an embodiment of the present invention, shown without a drive wheel and track.
Figure 5:
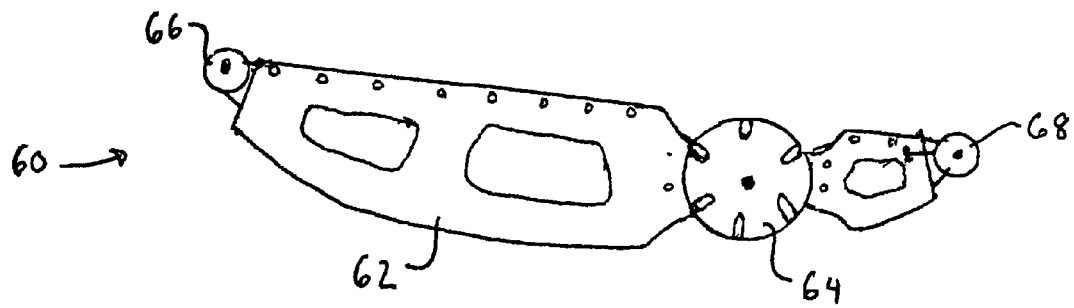
FIG. 5 illustrates a side view of the front endless track of FIG. 3 with a drive wheel attached.

With reference to FIGS. 1-3, illustrated is a snowmobile, indicated generally at 10, having a multiple track propulsion system in accordance with an embodiment of the present invention, in which the multiple track propulsion system comprises at least one front drive system operable together with or independent of a rear drive system. The snowmobile has a body, shown generally at 12, including a frame 14, a seat portion 16, handlebars 18, and an engine compartment 20. The multiple track propulsion system, indicated generally at 30, is configured to propel the snowmobile over a ground surface that may consist of a variety of terrain types, but is typically a snow-covered ground surface. The multiple track propulsion system 30 can include a single rear endless or continuous track 40 and a pair of front endless or continuous tracks 60 supported and located or positioned in front of or forward the rear endless track, as shown in FIG. 2. A rear fender 22 including a snow flap 24 can be disposed over at least a portion of the rear track 40.

The rear endless track 40 can be disposed or positioned, at least in part, under the rear or seat portion 16 of the snowmobile. The rear endless track 40 can also be operably supported about a rear ground contacting assembly that is supported by the frame 14 and/or snowmobile body 12 and that is configured to permit the rear endless track 40 to engage the ground surface to provide active displacement about the ground surface to propel the snowmobile.

A power supply 100, such as an engine or a motor, can be disposed in the engine compartment 20 of the snowmobile body 12. The power supply 100 can be operably configured to power the rear endless track 40 and the pair of front endless tracks 60 in order to propel the snowmobile 10.

Referring to FIG. 2, the pair of steerable front endless tracks 60 can be positioned forward of the rear endless track 40. The pair of front endless tracks 60 can also be oriented in a spaced-apart, parallel relationship to one another, and can be operable to engage the ground surface to provide active displacement about the ground surface to propel the snowmobile. The pair of front endless tracks 60 can also be operatively coupled to the pair of handlebars 18, via the respective ground contacting assemblies and the snowmobile's steering system, and can be made to turn as the handlebars 24 are turned in order to steer the snowmobile 10.

Referring to FIG. 3, the single rear endless track 40 and the pair of steerable front endless tracks 60 form a propulsion system including three endless tracks. In one aspect, the pair of front endless tracks 60 can be oriented in a substantially coaxial relationship with one another about a transverse axis, indicated by dashed line 61. Additionally, the pair of front endless tracks can be oriented in a parallel relationship and spaced apart relationship with respect to one another. Moreover, the pair of front endless tracks can be approximately equally spaced on opposite sides of a longitudinal centerline, indicated by dashed line 63 of the frame 14 and the snowmobile body 12.

Additionally, the single rear endless track 40 can be positioned substantially behind the space 65 between the pair of front endless tracks 60. The rear endless track 40 can also be positioned substantially on the longitudinal centerline 63 of the frame 14 and snowmobile body 12 and also behind the pair of front endless tracks. In this way, the three tracked snowmobile described herein can be similar in size and shape to typical snowmobiles known in the art that have front skis instead of front endless tracks.

FIGS. 4-7 illustrate a front ground contacting assembly in accordance with one exemplary embodiment of the present invention. As shown, the front ground contacting assembly comprises a front endless track 60 operably supported about a track frame 62. The track frame 62 can function as a spacer for a drive or bogie wheel 64 and idler and tension wheels 66 and 68 (see FIG. 5).

Figure 6:
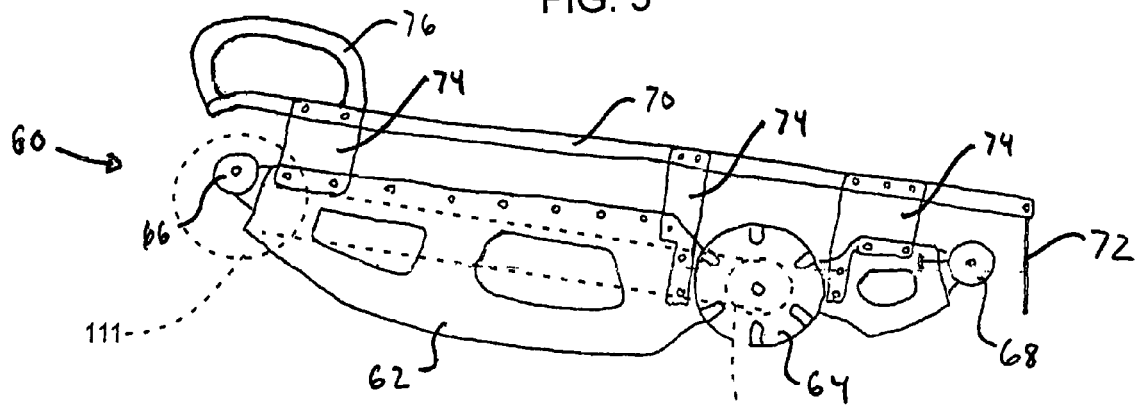
FIG. 6 illustrates a side view of the front endless track of FIG. 3 with a fender and drive wheel attached.

A fender 70 and snow flap 72 can also be attached by fender mounts 74 to the track frame 62 (see FIG. 6). A handle 76 can be coupled to the fender to assist in manually moving or positioning the front endless track 60.

Figure 7:
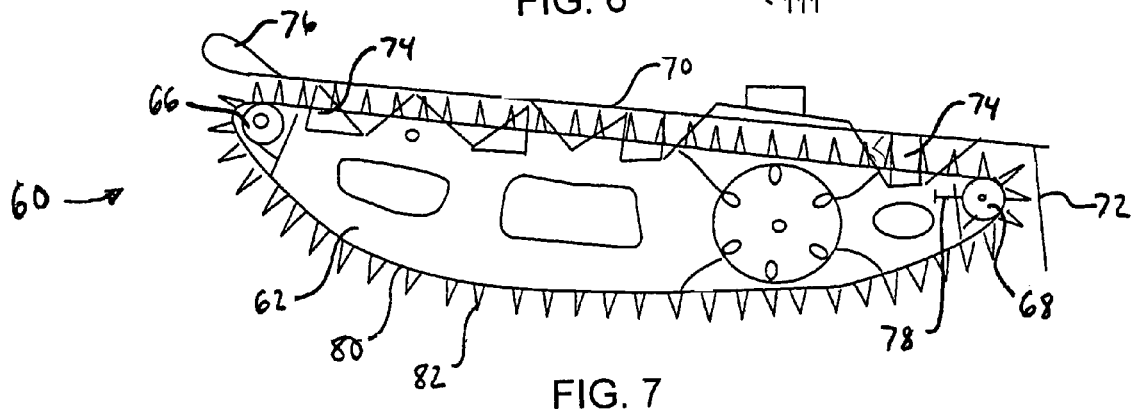
FIG. 7 illustrates a side view of the front endless track of FIG. 3 with a drive wheel, fender and track attached.

A continuous or endless track 80 can be stretched between the idler wheel 66 and tension wheel 68 (see FIG. 7). A tension adjustment bolt 78 can be turned to move the tension wheel 68 to adjust the tension in the track 80. The tension adjustment for the rear tension wheel 68 allows the track 80 to be removed and replaced, or adjusted to accommodate environmental conditions, such as colder temperatures, soft or hard pack snow, and level or rough terrain. Advantageously, the tension adjustment bolt can also allow for fine tuning of the tension in the track if the track stretches over time due to wear and tear.

The track 80 can have an internal tread (not shown) that can engage the drive or bogie wheel 64 so that as the drive wheel rotates, the drive wheel can engage the internal tread and rotate the track 80. The frame 62 can also act as a rail to support and guide the track 80 as the track rotates around the frame 62. The track can also have an external tread 82 that can engage the ground in order to propel the snowmobile 10.

Figure 8:
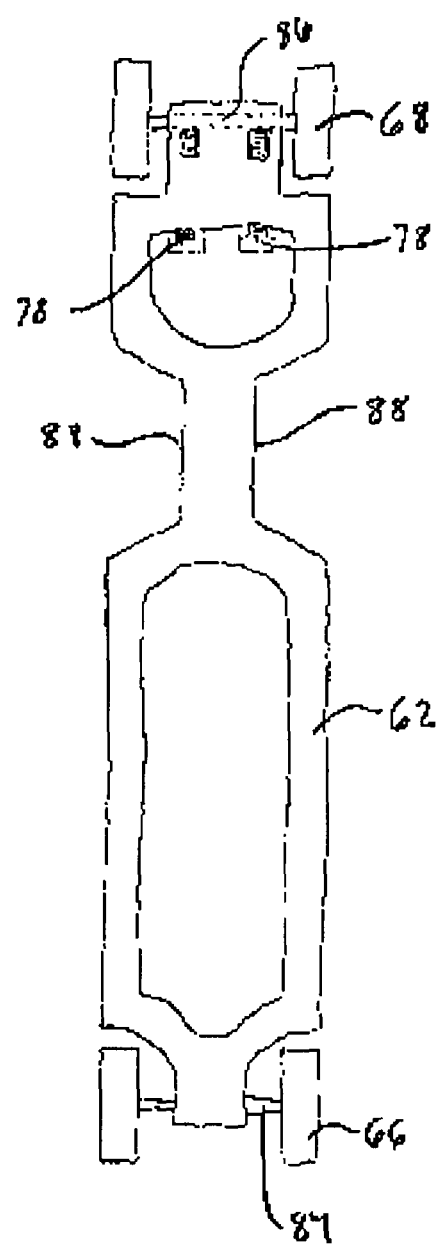
FIG. 8 illustrates a top view of the front endless track of FIG. 3.
Figure 9:
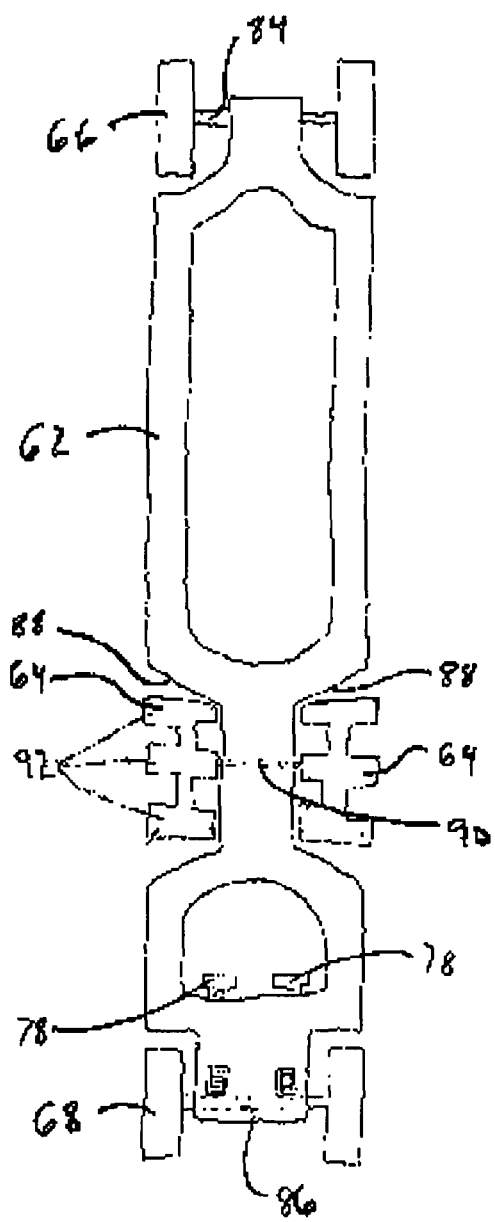
FIG. 9 illustrates a top view of the front endless track of FIG. 3 with drive wheels attached.
Figure 10:
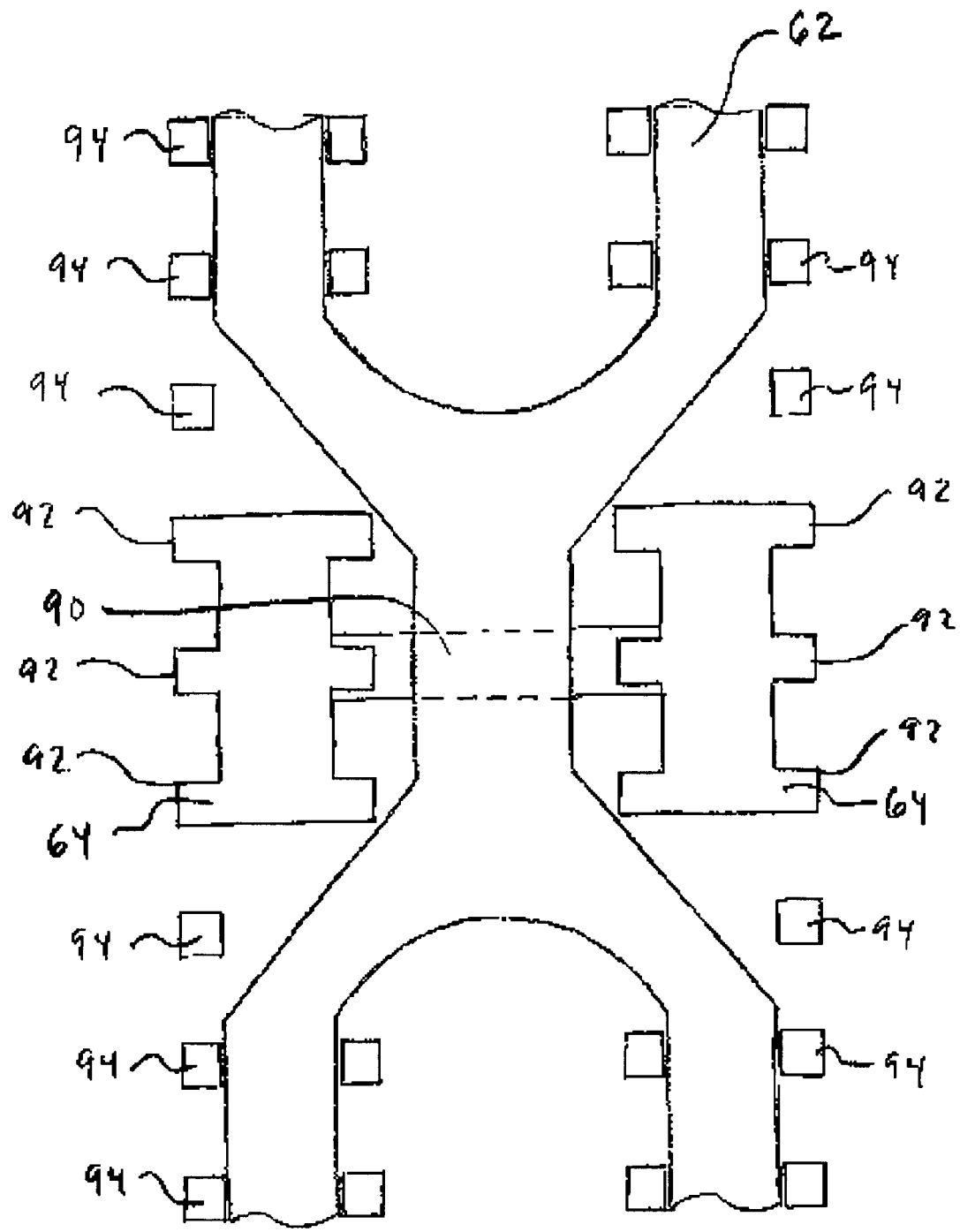
FIG. 10 illustrates a partial top cross sectional view of the front endless track of FIG. 6.

FIGS. 8-9 illustrate the placement of the drive, idler and tension wheels on the track frame 62. As shown, the idler wheel 66 can be rotatably coupled to an axle 84 that extends through a forward portion of the frame 62. The idler wheel 66 can freely rotate in either a forward or reverse direction. The tension wheel 68 can be rotatably coupled to an axle 86 that extends through a rear portion of the frame 62. The tension wheel axle 86 can be longitudinally movable within the frame 62 between a forward and rearward position in order to increase or decrease tension in the track 80. The tension wheel axle 86 can be moved by tension adjustment bolts 78 that extend through the frame 62 and contact the axle 86.

The frame 62 can have a drive wheel well 88 located between the idler and tension wheels 66 and 68 (see FIG. 9). A pair of drive wheels 64 can be placed in the wheel well 88 and an axle 90 can extend through the frame 62 between the drive wheels 64 so that the drive wheels can rotate about the axle 90 in the wheel well. The drive wheels 64 can have engagement teeth 92 that can engage the inner tread of the track 80.

Also illustrated is the relationship of the drive wheel 64 with the frame 62 and the endless track 80. As described above, the drive wheels 64 can be disposed in wheels wells 88 on either side of the frame 62. The axle 90 can extend through the frame 62 between the drive wheels. The internal tread can have protrusions, shown in cross section at 94 that can engage the teeth 92 of the drive wheels. The protrusions 94 can be positioned on the track 80 to avoid interference between the frame and the drive wheel teeth. Thus, as the track rotates around the frame, the track can lift off the frame as the track crosses over the wheel wells, and the protrusions avoid contact with the frame so as to have a clear approach to the drive wheel engagement teeth. Similarly, the protrusions have a clear approach to the frame as the protrusions rotate away from the drive wheel. In this way, the frame acts as a guide rail to the track and minimizes unwanted interference between the internal tread of the track and the frame.

Returning to FIG. 2, the pair of front endless tracks 60 can be operatively coupled to support arms 110 that are, in turn, operatively coupled to the snowmobile frame 14. The support arms can include a pair of steering arms 112 that can couple the pair of front endless tracks 60 to the handlebars 18 and also to a drive device 150 as described in greater detail below. Each of the pair of front endless tracks 60 can pivot with respect to the support arms 110 to accommodate variations in the elevation of the terrain. Moreover, the support arms 110 can pivot with respect to the frame 14 in order to further accommodate terrain elevation changes. A shock absorber 114 can be operatively coupled to the support arms 110 and can function to dampen movement of each of the pair of front endless tracks 60 due to terrain elevation changes. Thus, the support arms 110, the steering arms 112, and the shock absorber 114 can all connect at a single point 116 over the front endless track 60, and the endless track can pivot below this single point 116.

Additionally, the general shape of the front endless tracks 60 can assist in traversing various types of terrain. Specifically, the front of the track can be sloped upward away from the terrain so as to reduce the front of the track digging into the snow in front of the snowmobile. Furthermore, the front endless tracks 60 can have width sufficient to reduce sinking in soft snow, mud or water. Thus, the shape and size of the front endless tracks can contribute to the buoyancy of the snowmobile, or the ability of the snowmobile to stay on top of the terrain.

Figure 11:
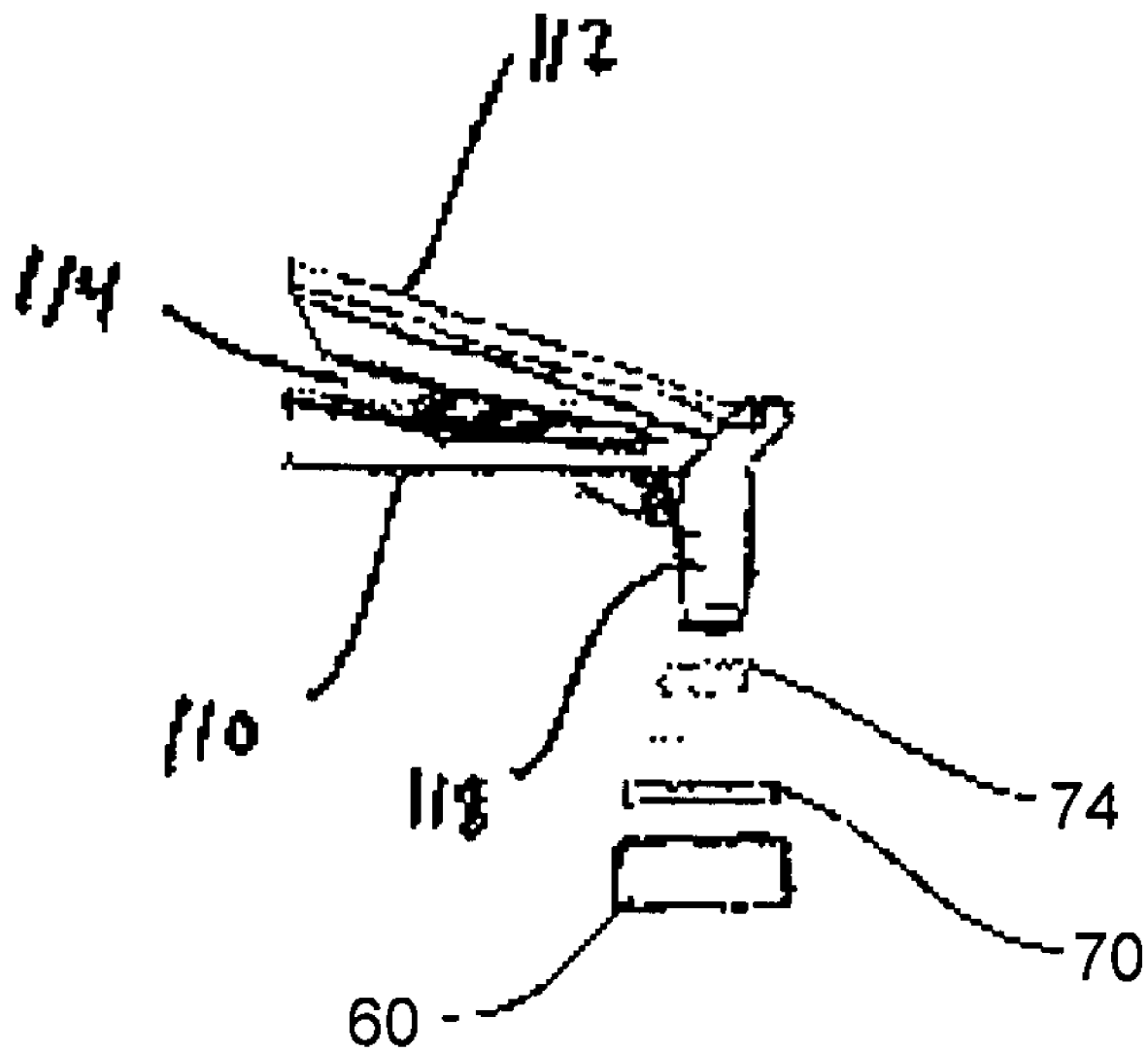
FIG. 11 illustrates a side view of a support arm in accordance with an embodiment of the present invention for the front endless track of FIG. 3.

Referring to FIG. 11, the support arms 110 can be configurable to accommodate the elevation of a pair of skis, and can be reconfigurable to accommodate the elevation of a pair of endless tracks. For example, vertical height of the support arm between the single point 116 and the front endless track 60 can be added or removed by attaching spacers 118 to the support arm 110. Advantageously, the support arms that hold a pair of front skis on a traditional snowmobile can easily be modified to attach to and correctly position a pair of front endless tracks 60 in accordance with the present invention. Thus, the present invention can be retrofit onto an existing snowmobile.

Figure 12:
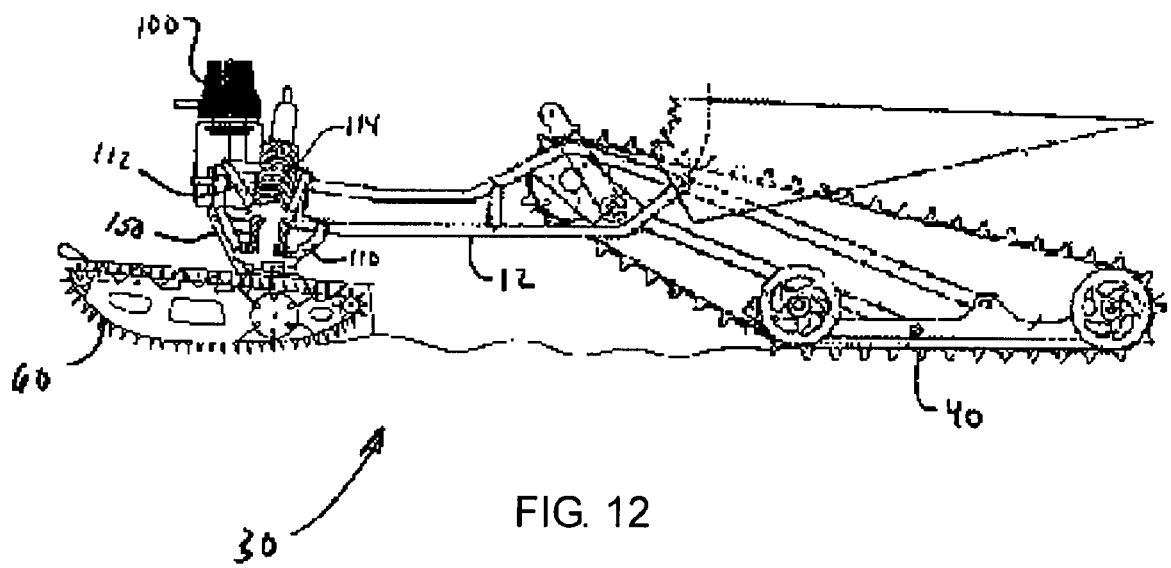
FIG. 12 illustrates a side view of the snowmobile of FIG. 1 without the snowmobile body.
Figure 13:
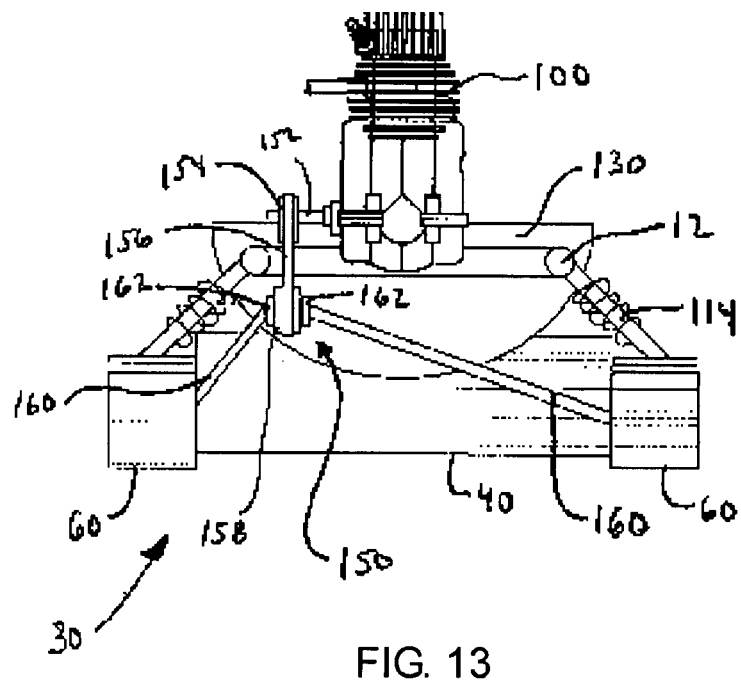
FIG. 13 illustrates a front view of the snowmobile of FIG. 11.

Referring to FIGS. 12-13, illustrated is the snowmobile propulsion system 30 coupled to the snowmobile frame 14, and power source 100 in accordance with the present invention. A drive device or drive train, shown generally at 150, can be coupled between the power supply 100 and the front endless tracks 60 to transfer power from the power supply 100 to the front endless tracks 60. The power supply can be coupled to a bulkhead 130 of the frame 14, and the drive device 150 extend from the power supply to the front endless tracks 60. The drive device 150 can be coupled to, or supported by the support arms 110. The drive device 150 can transfer power from the power supply 100 to the front endless tracks 60 to cause rotation of the pair of front endless tracks and propel the snowmobile 10.

The drive device 150 can include a power shaft 152 with a variable speed pulley 154 operatively coupled to the power supply 100. A belt or chain 156 can be coupled between the variable speed pulley 154 and a front shaft pulley 158 to transfer power from the variable speed pulley 154 to a front shaft 160. Universal joints 162 can couple the front shaft to the front shaft pulley. Universal joints 164 can also couple the front shaft to the drive wheels of each of the front endless tracks 60. Thus, in use, the power supply 100 can rotate the variable speed pulley 154, which can rotate the belt 156 which can turn the front shaft pulley 158. The belt 156 can rotate the front shaft 160, which can rotate the drive wheels 64 to engage the internal tread on the endless track 80 and rotate the endless track 80 to propel the snowmobile 10.

Returning to FIG. 13, a differential gear (not shown) can also be coupled between the front shaft pulley and the front shaft to differentially transfer power from the power supply to each of the pair of front endless tracks at a different rate. It will be appreciated that as a turn is made with the snowmobile 10, the front endless track on the outside of the turn will have to turn faster than the front endless track on the inside of the turn in order to maintain the speed and/or acceleration of the snowmobile. Advantageously, the differential gear adjusts the speed of each of the pair of front endless tracks 60 so that one can turn at a different rate than the other and thus accommodate turning of the snowmobile.

Figure 14:
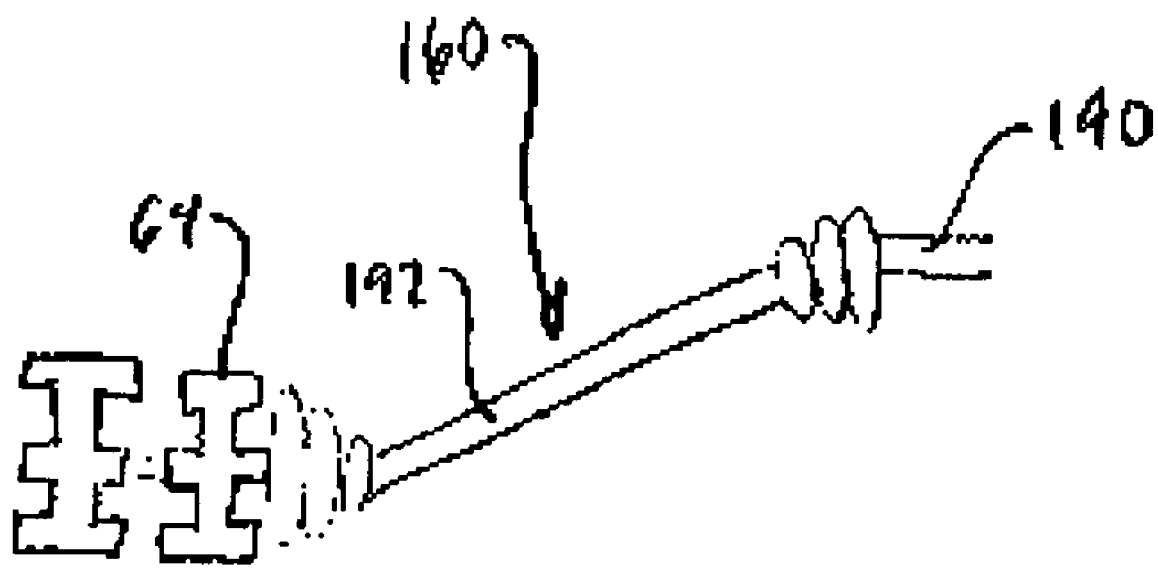
FIG. 14 illustrates a front view of a front axle in accordance with an embodiment of the present invention coupled to a drive wheel of the front endless track of FIG. 6.

Referring to FIG. 14, the front shaft 160 can also include a pre axle 190 coupled to one end of a double U-joint axle 192 with the other end of the U-joint axle coupled to the drive wheel 64. The double joint in the front shaft allows the drive device 150 to be placed at various locations within the frame 14. It has been found that the pre axle is best placed as low on the bulkhead as possible so as to be as close to the ground surface as possible. This orientation minimizes the angle between the pre axle and the U-joint axle and the angle between the U-joint axle and the drive wheels. It will be appreciated that a lower angle between these joints results in better shock absorption by the u-joint axle as the front endless tracks move up and down with respect to the power supply due to variations in the elevation of the terrain.

Figure 15:
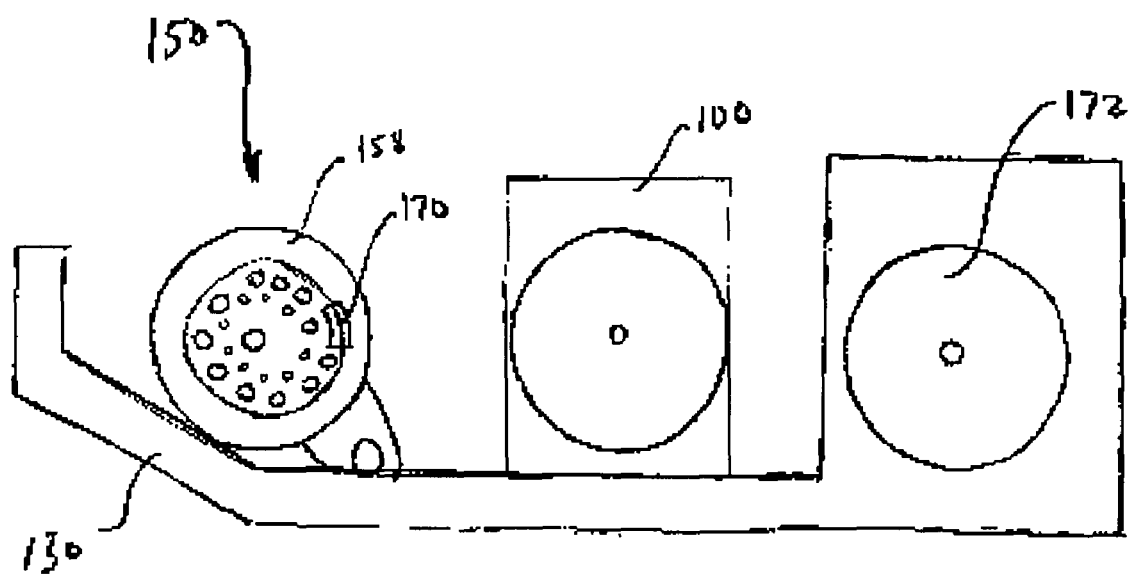
FIG. 15 illustrates a schematic side view of an engine compartment of the snowmobile of FIG. 1.

FIG. 15 illustrates the power supply 100 and drive device 150 coupled to the bulkhead 130. The drive device 150 can also include a front disk brake 170 that can slow the rotation, or prevent the rotation of the front track pulley 158. The drive device 150 can also include a rear pulley 172 that can transfer power from the power supply 100 to the rear track 40.

Figure 16:
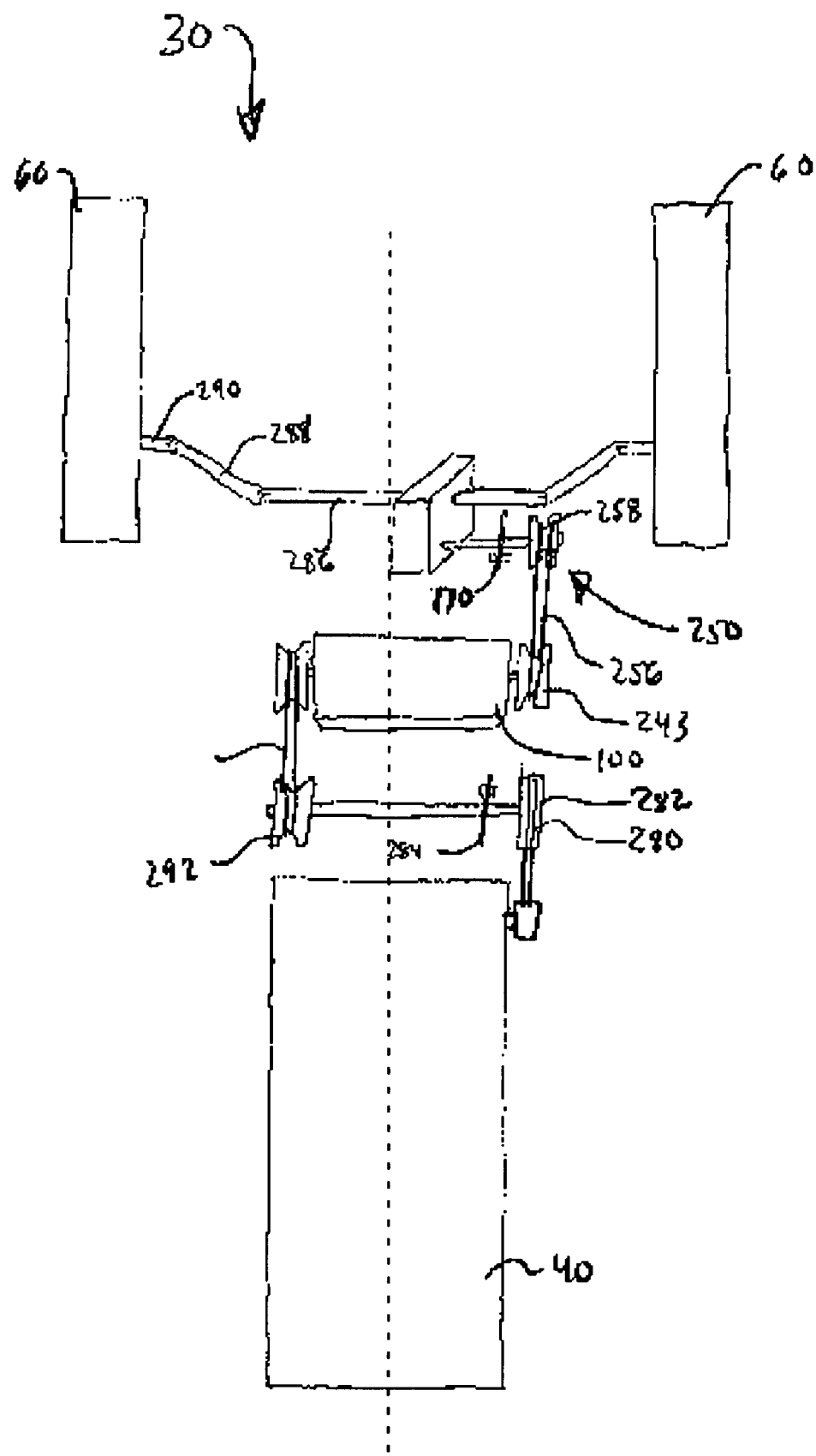
FIG. 16 illustrates a top view of a multiple track propulsion system for a snowmobile in accordance with another embodiment of the present invention.

As illustrated in FIG. 16, a drive device, indicated generally at 250, is shown coupled to a snowmobile propulsion system 30 in accordance with another exemplary embodiment of the present invention. The drive device 250 can be located on the right side of the power supply 100.

The drive device 250 can include a rear variable speed pulley 280 coupled to the rear track 40 and a front variable speed pulley 243 coupled to the pair of front endless tracks 60. The power supply 100 can drive the variable speed pulleys to transfer power from the power supply 100 to a belt or chain 256 coupled between the variable speed pulleys and a front pulley 258 and a rear pulley 292. The front pulley can drive the pair of front endless tracks 60 and the rear pulley 292 can drive the rear endless track 40. The drive device 250 can also include a chain or belt case 282 to cover and protect the belt 256 during use. The drive device 250 can have a pre axle 286 coupled to universal joints 288 that coupled to front drive shafts 290 that can be coupled to each of the front endless tracks 60.

The drive device 250 can have a disk brake 284 operatively coupled to the rear track 40 to slow rotation, or prevent rotation of the rear track. With the drive device 250 located on the right side of the power supply, disk brake 284 can be located on the right side of the snowmobile and the controls (not shown) for the brake can be located on the right side of the handlebar 18.

In use, the power supply 100 can rotate the variable speed pulleys 280 and 254. The front variable speed pulley 254 can rotate a chain or belt 256 to rotate a front pulley 258. The front pulley 258 can rotate the front pre axle 286 which can turn the universal joints 288. The universal joints 288 can rotate the front shaft 260 which can turn the front endless track 60.

Figure 17:
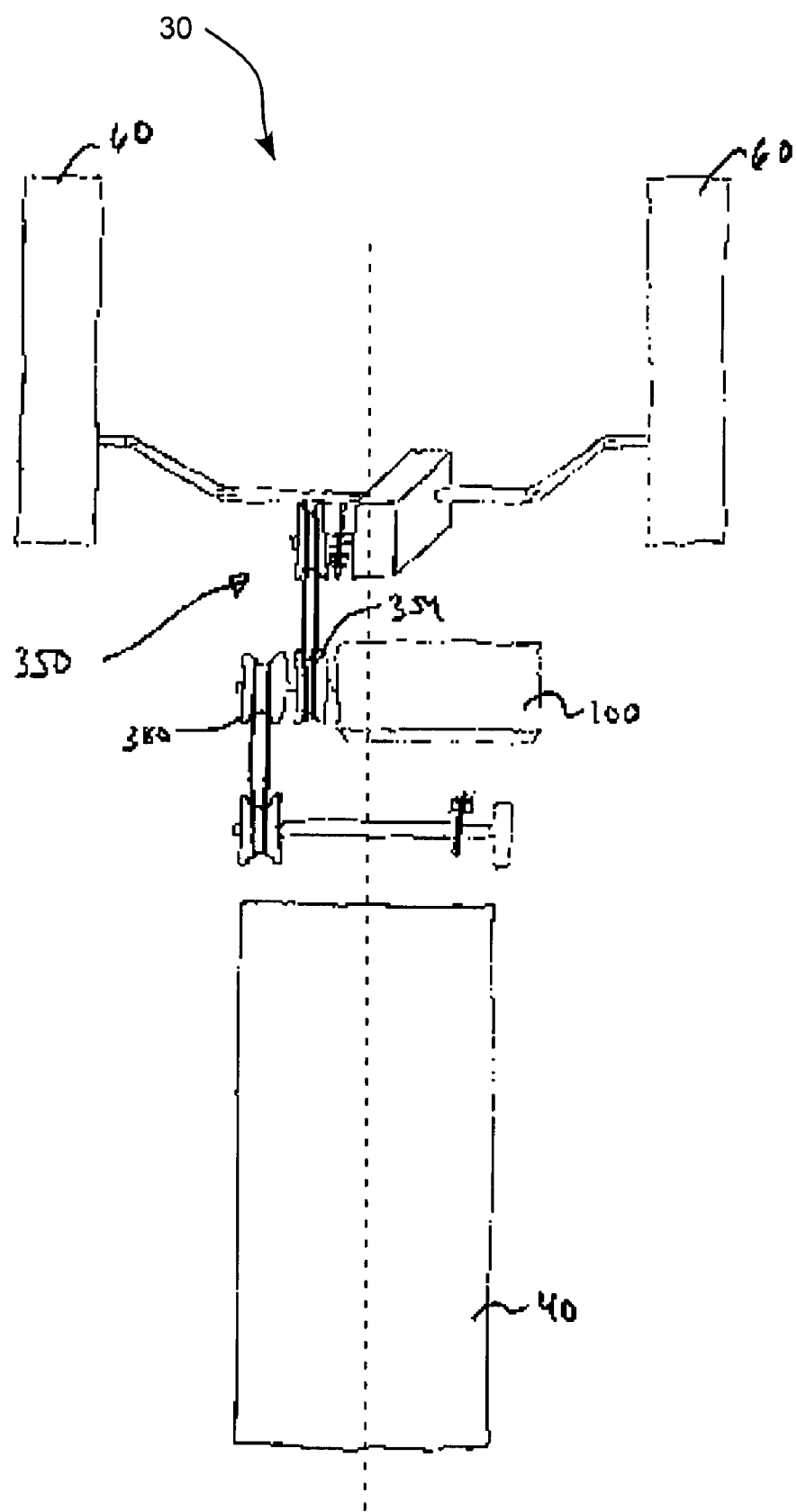
FIG. 17 illustrates a top view of a multiple track propulsion system for a snowmobile in accordance with another embodiment of the present invention.

As illustrated in FIG. 17, a drive device, indicated generally at 350, is shown coupled to a snowmobile propulsion system 30 in accordance with another exemplary embodiment of the present invention. The drive device 350 can have a rear endless track 40, a pair of front endless tracks 60 and a power supply 100. The drive device can also have a front variable speed pulley 354 and a rear variable speed pulley 380. The front variable speed pulley can power the front endless tracks 60 and the rear variable speed pulley 280 can power the rear endless track 40. The power supply 100 can be off-set to the right of the engine compartment to make room for both the rear and front variable speed pulleys.

Figure 18:
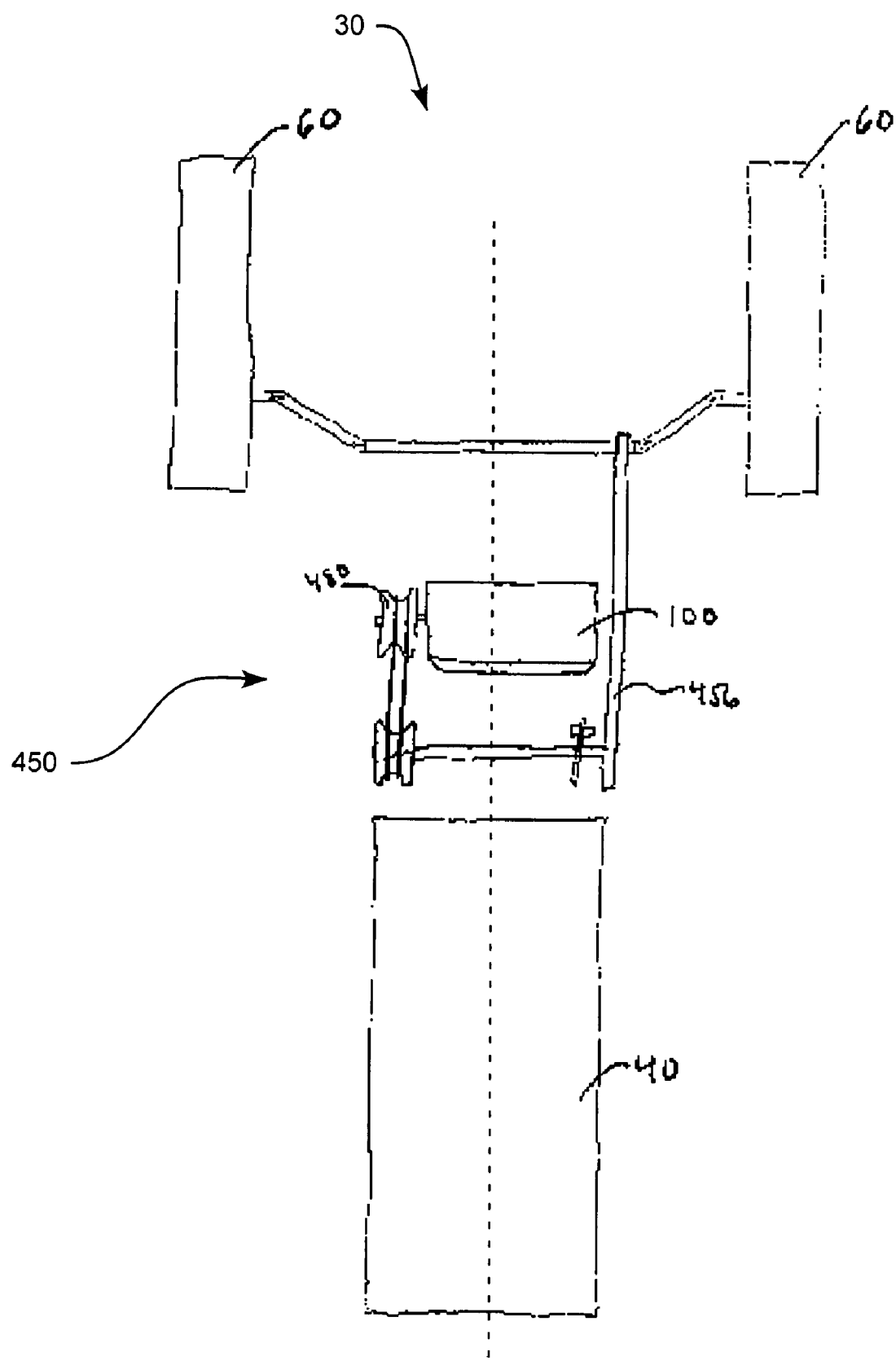
FIG. 18 illustrates a top view of a multiple track propulsion system for a snowmobile in accordance with another embodiment of the present invention.

As illustrated in FIG. 18, a drive device, indicated generally at 450, is shown coupled to a snowmobile propulsion system 30 in accordance with still another exemplary embodiment of the present invention. The drive device 450 can have a rear endless track 40, a pair of front endless tracks 60 and a power supply 100. The drive device can also have a variable speed pulley 480. The variable speed pulley can rotate a single belt or chain that 456 can transfer power to both the front endless tracks 60 and the rear endless track 40.

Figure 19:
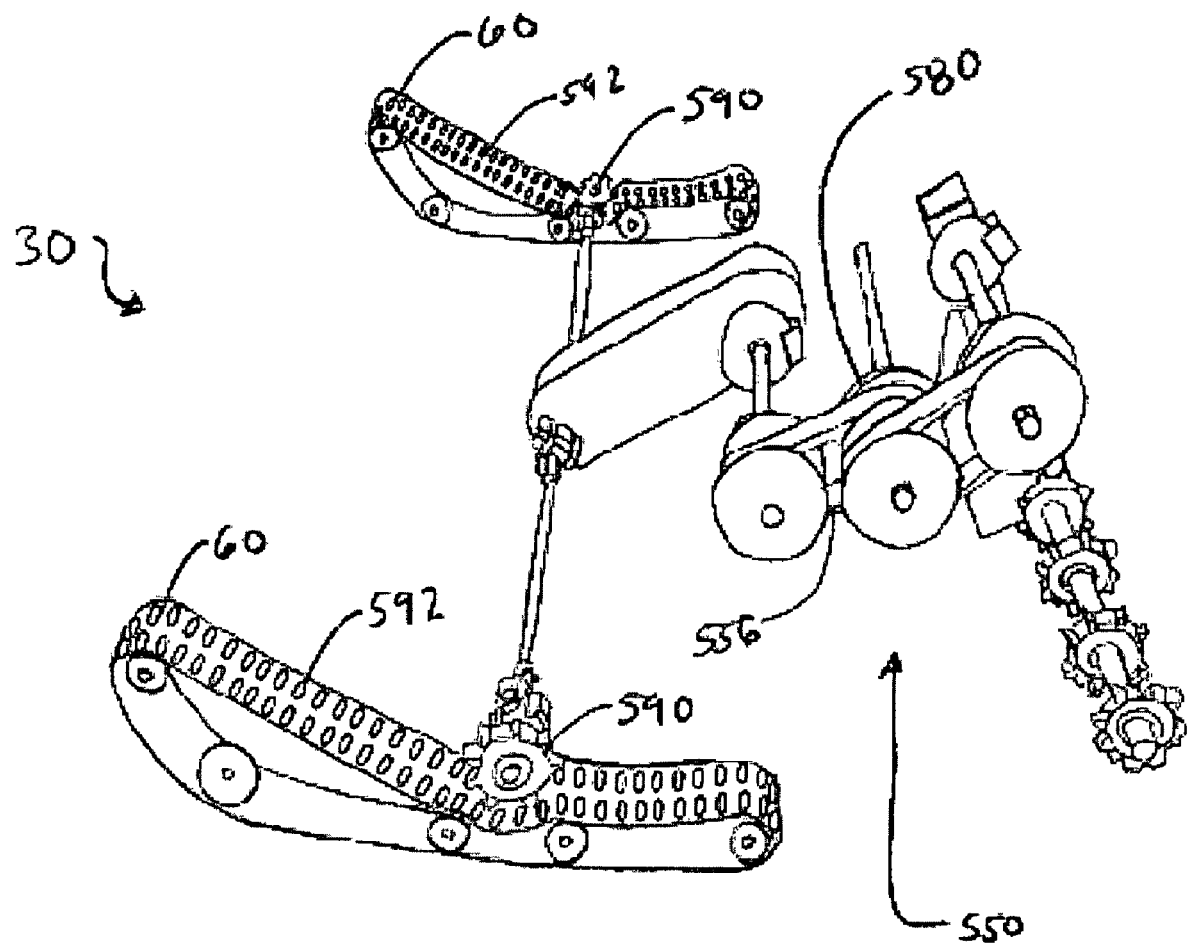
FIG. 19 illustrates a perspective view of a multiple track propulsion system for a snowmobile in accordance with another embodiment of the present invention.

As illustrated in FIG. 19, a drive device, indicated generally at 550, is shown coupled to a snowmobile propulsion system 30 in accordance with still another exemplary embodiment of the present invention. The drive device 550 can have a rear endless track (not shown), a pair of front endless tracks 60 and a power supply (not shown). The drive device can also have a variable speed pulley 580. The variable speed pulley can rotate a single belt or chain that 556 can transfer power to both the front endless tracks 60 and the rear endless track.

Additionally, the front endless tracks 60 can have a drive wheel 590 on each of the pair of front endless tracks 60 that is operatively disposed on an exterior tread surface 592 of the front endless track 60. The drive wheel 590 can rotate and engage the exterior tread surface 592 in order to rotate the endless track and, thus, propel the snowmobile.

Advantageously, positioning the drive wheel on an exterior tread surface facilitates shaping of the front endless track into a shape approximating a ski with an upturned front end. Having an upturned front end allows the track to grab the terrain and pull the snowmobile forward rather than downward and thus facilitates floating or planing of the triple track snowmobile over snow covered terrain.

It will be appreciated that various position arrangements and configurations for positioning the drive wheels, idler wheels, and tensioners can be used to power and maintain stability of the pair of front endless tracks. For example, the drive wheel could be placed as the head wheel or first wheel at the front of the endless track, as shown by dashed lines 111 in FIG. 6. In this example, belts or chains can be used to transfer power from the pulleys to the drive wheel. As another example, the drive wheel can be placed as the tail wheel or last wheel at the back of the endless track. Other drive wheel positions can also be used to power the endless tracks, as known in the art.

The present invention also provides for a method for moving a snowmobile including operating a power supply supported by the snowmobile and causing the power supply to turn a pair of front endless tracks and a rear endless track. The front endless tracks can be disposed in a spaced apart parallel relationship to one another and positioned in front of the rear endless track. A ground surface can be engaged with the front endless tracks and a rear endless track to propel the snowmobile.

The present invention also provides for a method for moving a snowmobile including starting a motor operable with the snowmobile. The motor causes a pair of front endless tracks and a rear endless track to turn. The front endless tracks can be disposed in a spaced apart parallel relationship to one another and in front of the rear endless track. A ground surface can be engaged with the front endless tracks and the rear endless track to propel the snowmobile. Additionally, a handlebar operatively coupled between the snowmobile body and the pair of front endless tracks can be turned to turn the pair of front endless tracks and steer the snowmobile.

The present invention also provides for a method for distributing power from a snowmobile power source to a pair of front endless tracks and a rear endless track including coupling at least one power transfer device to a snowmobile power source. Power from the at least one power transfer device can be sent to the pair of front tracks on the snowmobile to turn the front endless tracks. Power from the at least one power transfer device can also be sent to the rear endless track to turn the rear endless track.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited. Accordingly, the scope of the invention should be determined solely by the appended claims and their legal equivalents, rather than by the descriptions and examples given above.

What is claimed and desired to be secured by Letters Patent is:

1. A snowmobile having a multiple track propulsion system, comprising:
    a) a snowmobile body having a frame, a seat, and handlebars;
    b) a multiple track propulsion system for propelling said snowmobile, said multiple track propulsion system comprising:
        i) a single rear endless track disposed substantially under said seat of said snowmobile body and operably supported to engage a ground surface; and
        ii) a pair of steerable front endless tracks positioned forward of said rear endless track in a spaced-apart, parallel relationship to one another, and operably supported by said frame to engage said ground surface;
    c) a power supply disposed within said snowmobile body and operably coupled to said rear endless track and said pair of front endless tracks to turn said rear and front endless tracks and propel said snowmobile, said pair of front endless tracks providing active displacement about said ground surface similar to said rear endless track, said pair of front endless tracks being coupled to said frame by support arms; and
    d) a drive device supported by said support arms, said drive device being configured to transfer power from said power supply to said pair of front endless tracks for causing rotation of said pair of front endless tracks, wherein said drive device comprises:
        i) a variable speed pulley operably coupled to said power supply;
        ii) a front shaft pulley operably coupled to said variable speed pulley; and
        iii) at least one front shaft operably coupled to said front shaft pulley and said pair of front endless tracks.

2. A snowmobile in accordance with claim 1, wherein said single rear endless track and said pair of steerable front endless tracks form a propulsion system including only three endless tracks with said pair of front endless tracks being oriented in a substantially coaxial, parallel relationship and having a space therebetween, and said single rear endless track being positioned substantially behind said space between said pair of front endless tracks.

3. A snowmobile in accordance with claim 1, wherein said pair of front endless tracks are operatively coupled to said handlebars to be turned by said handlebars in order to steer said snowmobile.

4. A snowmobile in accordance with claim 1, wherein said drive device further comprises:
    a belt or chain operatively coupled to said front shaft pulley and said variable speed pulley to transfer power from said variable speed pulley to said front shaft pulley.

5. A snowmobile in accordance with claim 1, wherein each of said pair of front endless tracks further include:
    a drive wheel operatively coupled to said front shaft to rotate with said front shaft, said drive wheel being operably engaged with said front endless track to turn said front endless track to transfer power from said front shaft to said front endless track;
    at least one idler wheel in contact with said front endless track and positionable with respect to said drive wheel to maintain spacing and tension in said front endless track; and
    a tensioner operatively coupled to said front endless track and configured to increase or decrease tension in said front endless track around said drive and idler wheels.

6. A snowmobile in accordance with claim 5, wherein said drive wheel of each of said pair of front endless tracks is operatively disposed on an exterior tread surface of said front endless track, and operable to engage said exterior tread surface to rotate said endless track.

7. A snowmobile in accordance with claim 1, wherein said multiple track propulsion system further comprises a differential gear operatively coupled to said pair of front endless tracks to differentially transfer power from said power supply to each of said pair of front endless tracks at a different rate.

8. A snowmobile in accordance with claim 1, wherein each of said pair of front endless tracks has a fender disposed over said front endless track to reduce snow being thrown upward from said front endless track, and said fender includes a handle extending upward therefrom to allow lifting of said pair of front endless tracks.

9. A snowmobile comprising:
 a) a frame having a longitudinal centerline;
 b) a power supply supported by said frame operable to propel said snowmobile;
 c) a first front ground contact assembly supported by said frame and configured to be steerable; and
 d) a second front ground contact assembly supported by said frame and configured to be steerable;
 e) a rear ground contact assembly supported by said frame,
 f) said first front ground contact assembly and said second front ground contact assembly being oriented in a substantially coaxial parallel relationship and approximately equally spaced on opposite sides of said longitudinal centerline of said frame, and said rear ground contact assembly being positioned substantially on said longitudinal centerline of said frame and behind said first and second front ground contact assemblies;
 g) said first and second front ground contact assemblies and said rear ground contact assembly each comprising an endless track propelled by said power supply to provide active displacement about a ground surface and propel said snowmobile;
 h) said first and second front ground contact assemblies forming a pair of front endless tracks; and
 i) a drive device operably coupled to said power supply and said pair of front endless tracks, and configured to transfer power from said power supply to said pair of front endless tracks for causing rotation of said pair of front endless tracks, said drive device comprising:
  1) a variable speed pulley operably coupled to said power supply;
  2) a front shaft pulley operably coupled to said variable speed pulley; and
  3) at least one front shaft operably coupled to said front shaft pulley and said pair of front endless tracks.

10. A snowmobile in accordance with claim 9, wherein said drive device further comprises:
 a belt or chain operatively coupled to said front shaft pulley and said variable speed pulley to transfer power from said variable speed pulley to said front shaft pulley.

11. A snowmobile in accordance with claim 9, wherein each of said pair of front endless tracks further include:
 a drive wheel operatively coupled to said front shaft to rotate with said front shaft, said drive wheel operably engaged with said front endless track to turn said front endless track to transfer power from said front shaft to said front endless track;
 at least one idler wheel in contact with said front endless track and positionable with respect to said drive wheel to maintain spacing and tension in said front endless track; and
 a tensioner operatively coupled to said front endless track and configured to increase or decrease tension in said front endless track around said drive and idler wheels.

12. A snowmobile in accordance with claim 11, wherein said drive wheel of each of said pair of front endless tracks is operatively disposed on an exterior tread surface of said front endless track, and operable to engage said exterior tread surface to transfer power from said power supply to said front endless track.

13. A snowmobile in accordance with claim 9, further comprising:
 a differential gear operatively coupled to said pair of front endless tracks to differentially transfer power from said power supply to each of said pair of front endless tracks at a different rate.

14. A snowmobile having a multiple track propulsion system, comprising:
 a) a snowmobile body having a frame, a seat, and handlebars;
 b) a power supply disposed within said snowmobile body;
 c) a multiple track propulsion system for propelling said snowmobile, said multiple track propulsion system comprising:
  i) a single rear endless track disposed substantially under said seat of said snowmobile body and operably supported to engage a ground surface, said rear endless track being operably coupled to said power supply;
  ii) a pair of steerable front endless tracks positioned forward of said rear endless track in a spaced-apart, parallel relationship to one another, and operably supported by said frame to engage said ground surface, said pair of front endless tracks being operably coupled to said power supply; and
 d) a drive device being configured to transfer power from said power supply to said pair of front endless tracks for causing rotation of said pair of front endless tracks, said drive device comprising:
  i) a pulley system operably coupled to and rotated by said power supply, said pulley system comprising at least two operably coupled pulleys; and
  ii) at least one front shaft being rotatable by operation of said power supply, said front shaft operably coupled to said pulley system at a first shaft end and operably coupled at a second shaft end to said pair of front endless tracks to cause rotation of said pair of front endless tracks.

15. A snowmobile in accordance with claim 14, wherein said pair of front endless tracks are operatively coupled to said handlebars to be turned by said handlebars in order to steer said snowmobile.

16. A snowmobile in accordance with claim 14, wherein said at least two pulleys from said pulley system comprise:
 a variable speed pulley operably coupled to said power supply;
 a front shaft pulley operably coupled to said variable speed pulley and said front shaft; and
 said drive device further comprising:
  a belt or chain operatively coupled to said variable speed pulley and said front shaft pulley to transfer power from said variable speed pulley to said front shaft pulley.

17. A snowmobile in accordance with claim 14, wherein each of said pair of front endless tracks further include:
 a drive wheel operatively coupled to said front shaft to rotate with said front shaft, said drive wheel being operably engaged with said front endless track to turn said front endless track to transfer power from said front shaft to said front endless track;
 at least one idler wheel in contact with said front endless track and positionable with respect to said drive wheel to maintain spacing and tension in said front endless track; and a tensioner operatively coupled to said front endless track and configured to increase or decrease tension in said front endless track around said drive and idler wheels.

18. A snowmobile in accordance with claim 17, wherein said drive wheel of each of said pair of front endless tracks is operatively disposed on an exterior tread surface of said front endless track, and operable to engage said exterior tread surface to rotate said front endless track.

19. A snowmobile in accordance with claim 14, wherein said multiple track propulsion system further comprises a differential gear operatively coupled to said pair of front endless tracks to differentially transfer power from said power supply to each of said pair of front endless tracks at a different rate.

20. A snowmobile in accordance with claim 14, wherein each of said pair of front endless tracks has a fender disposed over said front endless track to reduce snow being thrown upward from said front endless track, and said fender includes a handle extending upward therefrom to allow lifting of said pair of front endless tracks.

* * * * *